United States Patent Office 3,226,297
Patented Dec. 28, 1965

3,226,297
DENTIFRICE COMPOSITIONS COMPRISING POLYMETHYL METHACRYLATE ABRASIVES
Bo Thuresson af Ekenstam, Bofors, Bror Holger Fredrik von Fieandt, Upplands-Vasby, and Allan Richard Benjamin Furendal, Bofors, Sweden, assignors to Aktiebolaget Bofors, Bofors, Sweden, a corporation of Sweden
No Drawing. Filed Apr. 5, 1962, Ser. No. 185,226
Claims priority, application Sweden, Mar. 31, 1954, 3,008/54
3 Claims. (Cl. 167—93)

This application is a continuation-in-part of our co-pending application, Serial No. 494,803, filed March 16, 1955, and now abandoned.

This invention relates to cosmetic and pharmaceutical compositions containing as base material a pulverulent plastic; base materials for such compositions; and methods of manufacturing the same. More particularly, it is directed to powder and liniment bases that are applied to the skin wherein the products contain a powdered plastic of particular size, the plastic powder being innocuous to the skin.

Products used at present as powder and liniment bases are talc, kaolin and other mineral substances. However, they have the disadvantage that continued use thereof frequently causes irritation of the skin and sometimes even produces granulomas because of their irregular form. Starch products such as rice starch have also been used. These organic products however, are susceptible to fermentative or related actions.

It is among the principal objects of this invention to provide improved cosmetic and pharmaceutical compositions which are free from the above mentioned disadvantages. In accordance with this invention the novel preparations comprise a pulverulent plastic which obviates irritation of the skin by virtue of substantially spherically and generally regular form.

Plastic powders having the desired form and size may be obtained by polymerizing monomeric compounds having one or more polymerizable olefinic groups in aqueous emulsion employing special emulsifiers. The polymeric particles, of spherical form, present in the latices have a diameter of 0.2 to 3 micron, preferably 0.3 to 1 micron. These particles, which may be referred to hereafter as "primary particles," may be isolated from the emulsion and used in liniments, tooth paste and other pharmaceutical or cosmetic products.

Suitable particles of greater size, e.g., diameters of 3 to 30 microns may also be made by effectuating complexing or agglomeration or aggregation of the said primary particles present in the aforesaid latices by addition to the latices of organic solvents having good solubility in water as for example, acetone, methylethylketone, etc. The amount of these organic solvents in the mixture with the aqueous emulsion is so adjusted that polymer particles having a diameter of from about 3 to about 30µ are formed by the aggregation of the primary particles. Usually for 100 parts of the aqueous emulsion having a content of from 15% to 35% of polymers, from 5–40 parts of the organic, water miscible solvent may be used. The mixtures of polymer emulsion and the organic solvents are preferably heated to a temperature between 25° C. and about 75° C. for about one to four hours. The aggregated polymers are then separated from the liquid for example, by filtration and they may be dried at a temperature below the softening point of the polymers.

The aggregate polymer powders manufactured in accordance with this invention have a high absorption power for water and oil. They also adhere well and possess good covering power. They exhibit a beautiful dull lustre, a feature which renders them especially suitable as components of face powders.

By selecting suitable emulsifiers for the emulsion polymerization it is possible to obtain powders having an excellent feel to the touch and gliding characteristics. Emulsifiers especially suitable for producing such effects are esters of higher fatty acids with polyhydric alcohols. Of particular interest are plastic powders obtained from emulsions containing an emulsifier that possesses disinfecting activity. Examples of such emulsifiers are salts of quaternary ammonium compounds. Emulsifiers of that type are especially suitable and therefore give emulsions with relatively small particles.

Plastics suitable for compositions in accordance with this invention are preferably polymethyl methacrylate, polystyrene, polyisobutyl methacrylate and other plastics which are innocuous to the skin and form emulsions which, when dewatered, yield a non-caking product. There may also be used polymers of monomers containing 2 or more polymerizable groups such as polyallyl methacrylate and the polymers of the di-esters of methacrylic acid and ethylene glycol. By copolymerization of monomers having one polymerizable double bond with a few percent of monomers having two or more polymerizable double bonds, cross-linked insoluble products are obtained which often, in powder form, are especially valuable as base materials for cosmetic and pharmaceutical compositions.

There may be added to compositions manufactured in accordance with this invention, usual additives for powders and liniments such as perfume, dyestuffs, titanium dioxide, zinc oxide, zinc stearate, glycerine and water. When a perfume that is soluble in the plastic is used, a depot action is obtained whereby the perfume evaporates slowly and with a less rapid drop in the concentration thereof in the ambient atmosphere.

The primary particles may be used in the wet state, as for example, when embodied in "fluid make-ups," liniments, tooth paste, and other cosmetic or pharmaceutical compositions or products. The emulsion can be filtered and washed with water; and the washed filter cake is used directly for incorporation with other ingredients to form the desired end products.

The following are illustrative examples in accordance with this invention:

*Example 1*

A one-litre flask equipped with stirrer, reflux condenser and thermometer, is charged with 300 grams of water and 3 grams of sorbitol monostearate. Then 0.1 gram of the polymerization catalyst, ammonium persulphate is added, and when it has dissolved in the water, 100 grams of methyl methacrylate are added. The reaction mixture is heated with stirring to 75° C. and kept at this temperature for two hours and a half. During this period 0.1 gram of persulphate is added. The emulsion thus obtained is filtered, the wet cake poured on a drying tray and evaporated at approximately 40° C. The cake so obtained is disintegrated. In this way 90 grams of powder (primary particles) are obtained with properties according to the invention. The particle size is about 0.4 to 0.5 micron. The particles have a round form.

*Example 2*

A powder is prepared in accordance with the process of Example 1 except that the charge is 900 grams of water, 4.5 grams of sodium hexamethaphosphate, 2.4 grams of potassium persulphate and 300 grams of methyl methacrylate. This yields 290 grams of powder after drying and grinding. The particle size is about 0.8 micron.

Example 3

A powder is manufactured in accordance with the procedure of Example 1 except that 1.5 grams of sorbitol mono-oleate and 1.5 grams of polyoxyethylene sorbitol mono-oleate are used instead of 3 grams of sorbitol monostearate, and that 95 grams of methyl methacrylate and 5 grams of allyl methacrylate are used instead of 100 grams of methyl methacrylate. The process yields 96 grams of powdered material that can be used as cosmetic powder. This powder is insoluble in solvents. Each particle has a form as in Example 1. The particle size is about 0.4 micron.

Example 4

A powder is prepared in accordance with the process of Example 1 except that 3 grams of sorbitol trioleate and 3 grams of polyoxyethylene sorbitol trioleate are used instead of 3 grams of sorbitol monostearate, and that 100 grams of styrene are used instead of 100 grams of methyl methacrylate. This yields 65 grams of powder. The particle size is about 0.5 micron.

Example 5

A powder is prepared in accordance with the process of Example 1 except that the charge is 280 grams of water, 0.4 gram of stearyl dimethyl ethyl ammonium ethyl sulphate, 0.3 gram of hydrogen peroxide and 120 grams of methyl methacrylate. This yields 117 grams of powder after drying and grinding. The particles are of spherical form and are 0.35–0.45 micron.

Example 6

300 grams of the emulsion prepared in accordance with Example 1 were mixed with 30 grams of acetone and heated with stirring at 60° C. for 3 hours. After cooling to room temperature, the emulsion was filtered first through a wire gauze and then through a Buchner funnel with filter paper. The particles were retained on the filter, and washed with water, thereby removing the acetone and other water-soluble products, the result being a product with an extra-ordinary purity. The solids were dried at 70° C. On crumbling the smooth aggregates obtained had a size of 3 to 30 microns.

Example 7

A powder was prepared in accordance with the process of Example 1 except that 4 grams of bornyl acetate were added to the methyl methacrylate. A powder with pineneedle scent is obtained.

Example 8

100 grams of a powder made according to Example 1 were ball milled for 5 hours with 4 grams of bornyl acetate. A powder equal to that of Example 6 is obtained.

Example 9

A colored powder was made in accordance with the process of Example 1 except that 1 gram of Grasolrubin B was dissolved in the methyl methacrylate. A red powder suitable for mixing with other dyed or undyed powders was obtained.

Example 10

100 grams of powder made in accordance with Example 1 were ball milled with 10 grams of ultramarine blue.

Example 11

The powder base as manufactured in Example 5 is used in a face powder with the following composition: 80 parts powder base, 10 parts titanium dioxide (rutile) for toilet purposes, 2.5 parts burned sienna, 2.5 parts bolus rubrum, 5 parts magnesium stearate, 1 part paraffin oil, and 1 part perfume for powder. The components are mixed continuously.

Example 12

A liniment for dermatological purposes is manufactured as follows: 25 parts glycerol, 25 parts zinc oxide and 15 parts powder base, manufactured as in Example 1, are mixed in a container until homogeneity is obtained.

Example 13

In 200 grams of an emulsion not filtered or dried, in accordance with the procedure of Example 1, 27 grams of a 10% water solution of tragacanth, 0.5 gram of sodium lauryl sulphate, 0.2 gram of methyl p-hydroxybenzoate dissolved in 5 grams of ethanol and 0.2 gram of a flavouring sold under the trade name of Toothpaste Flavour D are worked in. The final product, which has a creamy consistency, is suitable for use as a toothpaste.

Example 14

A toothpaste is produced by mixing the following ingredients:

|  | G. |
|---|---|
| Powder according to Example 1 | 52.6 |
| Glycerol | 52.6 |
| Stannofluoride | 0.8 |
| Viscarin (thickening agent) | 0.75 |
| Sodium lauryl sulphate | 1.5 |
| Saccharine | 0.8 |
| Miaouli oil (flavouring) | 1 |

Viscarin is a carrageenan derivative produced by Société Anonyme des Techniques, Industrielle des Algues (SATIA), 104, Avenue des Champs-Elysées, Paris (8e).

The spherical particles, which are made entirely of organic material, are especially well adapted for being combined with stannofluoride or other ionic fluorine-emitting ingredients: The stannofluoride is normally comparatively unstable, but is of extremely great importance for the supply of fluorine to the teeth. The combination of the biochemically insert plastic particles and the stannofluoride gives the toothpaste a harmless cleaning as well as a caries-preventing effect, which does not diminish to any essential degree during storage.

Example 15

A sun-protective ointment is produced by mixing 50 grams of the powder obtained in accordance with the process of Example 1 in an ointment levigation machine together with 1 gram of tragacanth dissolved in 20 grams of glycerol and 75 grams of water.

The ointment has proved to give a particularly good protection effect, and that even to persons who are particularly sensitive to sunlight. Moreover, the ointment does not cause allergic reactions, which otherwise is often the case with sun-protective ointments known up to now.

It will be understood that the foregoing description of the invention and the examples set forth are merely illustrative of the principles thereof. Accordingly, the appended claims are to be construed as defining the invention within the spirit and scope thereof.

We claim:

1. A toothpaste comprising approximately equal amounts of a vehicular material conventionally used in toothpastes and polymethyl methacrylate having a particle sixe of 0.2 to 3 microns.

2. A toothpaste comprising approximately equal amounts of polymethyl methacrylate having a particle size of 0.2 to 3 microns and glycerine and a thickening agent in an amount sufficient to provide thickening activity.

3. A toothpaste in accordance with claim 2 which includes a surfactant in an amount sufficient to provide surfactant activity.

(References on following page)

References Cited by the Examiner

UNITED STATES PATENTS

| | | | |
|---|---|---|---|
| 2,130,034 | 9/1938 | Schmidt | 167—93 |
| 2,185,178 | 1/1940 | Beutmer. | |
| 2,501,927 | 3/1950 | Block | 167—58 |
| 2,556,260 | 6/1951 | Downing | 260—93.5 |
| 2,569,767 | 10/1951 | Knock | 167—58 |
| 2,580,277 | 12/1951 | Boyd et al. | 260—93.8 |
| 2,684,321 | 7/1954 | Thurmon et al. | 167—58 |
| 2,716,641 | 8/1955 | Plas | 260—92.8 |
| 2,754,289 | 7/1956 | Meyer | 260—92.8 |
| 2,901,400 | 8/1959 | Thomas | 167—93 |
| 2,928,797 | 3/1960 | Bruson et al. | 260—23 |
| 2,991,229 | 7/1961 | Ivison | 167—93 |
| 3,026,307 | 3/1962 | Gorham et al. | 260—89.5 |
| 3,030,349 | 4/1962 | Stickney et al. | 260—89.5 |
| 3,070,510 | 12/1962 | Cooley et al. | 167—93 |

OTHER REFERENCES

De Navarre: The Chemistry and Manufacture of Cosmetics, published by D. Van Nostrand Company, New York, 1941, pages 334–343, 350, 354, 356 and 361.

LEWIS GOTTS, *Primary Examiner.*

FRANK CACCIAPAGLIA, JR., *Examiner.*